United States Patent [19]

Berg et al.

[11] 3,895,035

[45] July 15, 1975

[54] PROCESS FOR THE PRODUCTION OF POURABLE, POWDERY, FILLER-CONTAINING RUBBER MIXTURES FROM RUBBER SOLUTIONS

[75] Inventors: Gerhard Berg; Karl-Heinz Nordsiek, both of Marl, Germany

[73] Assignee: Chemische Werke Huls, Marl, Germany

[22] Filed: Mar. 21, 1973

[21] Appl. No.: 343,433

[30] Foreign Application Priority Data
Mar. 23, 1972 Germany............................ 2214121

[52] U.S. Cl......... 260/33.6 AQ; 252/548; 260/34.2; 260/42.32; 260/42.33; 260/42.55; 260/80.7; 260/82.3; 260/83.7; 260/88.2 R; 260/584 R; 260/763; 260/765; 260/767
[51] Int. Cl... C08c 11/08; C08c 11/18; C08c 11/22
[58] Field of Search..............260/584 R, 41.5 MP, 260/33.6 AQ, 42.55, 80.7, 82.3, 83.7, 260/88.2 R; 252/548

[56] References Cited
UNITED STATES PATENTS

| | | | |
|---|---|---|---|
| 2,174,762 | 10/1939 | Schuette et al. | 252/532 |
| 2,559,584 | 7/1951 | Barker | 252/548 |
| 3,297,668 | 1/1967 | Berg et al | 260/85.1 |
| 3,326,848 | 6/1967 | Clemens et al. | 252/62.1 |

FOREIGN PATENTS OR APPLICATIONS

| | | |
|---|---|---|
| 1,029,532 | 5/1966 | United Kingdom |

OTHER PUBLICATIONS

Whitby—Synthetic Rubber (Wiley)(N.Y.)(1954), pp. 670–671, 676–677, & 679–680.

Noble—Latex in Industry (2nd Ed.) (Rubber Age) (N.Y.) (1953), pp. 357–359.

*Primary Examiner*—Donald E. Czaja
*Assistant Examiner*—H. H. Fletcher
*Attorney, Agent, or Firm*—Millen, Raptes & White

[57] ABSTRACT

Pourable, discrete, finely-divided, tack-free elastomer particles, preferably containing filler, are prepared from an aqueous elastomer emulsion comprising an elastomer dissolved in a volatile inert organic solvent having an emulsifying amount of an alkylamine or alkenylamine oxyalkylate surfactant and an aqueous suspension of a filler, which process comprises gradually adding the filler-containing aqueous elastomer emulsion into a hot aqueous precipitating bath maintained at a pH of 7 or less, and simultaneously evaporating the organic solvent to obtain a precipitate of particles in water, separating therefrom and drying to produce the said pourable filler-containing elastomer particles. The pourable particles are particularly suitable in vulcanization processes to form shaped objects.

31 Claims, No Drawings

PROCESS FOR THE PRODUCTION OF POURABLE, POWDERY, FILLER-CONTAINING RUBBER MIXTURES FROM RUBBER SOLUTIONS

DESCRIPTION OF THE PRIOR ART

The processing of rubbers into shaped objects is normally a multistage procedure. In contradistinction to the manufacture of molded components from thermoplastic synthetic resins, it is absolutely necessary, prior to the final shaping step, to conduct generally complicated mixing procedures to obtain a homogeneous incorporation of diverse additives to the cross-linking reaction. The relatively high viscosity of the raw materials makes it necessary to utilize heavy machinery such as rolling mills or internal mixers, which require high energy consumptions. The inherent costs of such energy and equipment are considerable and greatly impair the economy of the production of elastomeric materials.

The statistical distribution homogeneity required of the various components in the elastomer mixtures requires a considerable expenditure of time and energy in addition to high investment costs. During the solid state homogenization, the rubber particles and filler particles are displaced with respect to one another against a strong resistance. Even those portions of the mixture which already been sufficiently intermixed must still participate in the mixing procedure until a satisfactory dispersion of the entire mixture has been accomplished. The frictional heat generated requires a discontinuous mode of operation. In order to avoid or minimize the danger of premature vulcanization, the vulcanizing agents or a portion thereof are not added until a second operating step. However, the preparation of cross-linkable elastomers sufficiently stable for even intermediate storage periods requires expensive measures and is effected, in modern large-scale plants, by expensive pelletizing and storage in rotating containers. Further processing, involves the subsequent preparation of a blank on calenders and/or extruders, depending on the type of the finished article. The subsequent conventional vulcanization in presses or autoclaves completes the manufacturing process.

Many attempts have been made to reduce the above-mentioned difficulties and cost factors by the use of more economical and especially automated manufacturing methods, but they have heretofore been severely limited by the characteristic properties of the raw elastomer material. In order to simplify the aforementioned procedural steps, the masterbatches comprising coprecipitates of aqueous elastomer emulsions with carbon black have been proposed, by means of which other mixture components can also be incorporated. However, due to the strong inherent tackiness, such raw elastomer mixtures are commercially prepared as bales of hard, solid consistency analogous to the filler-free polymers. Consequently, in spite of the cost savings in producing the basic mixture, the machinery traditionally used was still necessary for the further processing operations.

In another attempt to simplify production of elastomer-filled mixtures, a specific precipitation technique was developed to prepare coprecipitates from synthetic rubber latices (e.g., SBR emulsion polymers) and highly active silicic acid. In this technique, latices containing anionic emulsifiers are mixed with an alkali silicate solution and precipted with acid in the presence of electrolyte solutions, as disclosed in German Pat. Nos. 1,148,067; 1,204,404; 1,297,858; 1,204,405; 1,215,918 and 1,245,093. The elastomer mixtures obtained in the above process, are very fine powders. It is possible to incorporate further additives into these elastomer mixtures by the use of simple agitator systems and without any substantial plasticizing and mixing procedures, and to utilize such elastomer for processing into rubber articles according to conventional procedures as disclosed in German Pat. Nos. 1,148,067 and 1,196,367. However, such coprecipitates are not suitable for broad scale applications, since it has been heretofore difficult if not impossible to produce powdery, carbon-black-containing rubber mixtures in this manner.

Other processes for producing carbon-black-containing rubber mixtures, from rubber solutions are known. Thus, in accordance with the so-called "Hydro-Solution-Masterbatch Process" as disclosed in U.S. Pat. No. 2,769,795; Belgian Pat. Nos. 619,992 and 620,801; and French Pat. Nos. 1,440,470, 1,443,769, and 1,371,688 such mixtures have been obtained, but pourable elastomeric mixtures in the form of powders or granules are not obtainable by this technique.

In view of the above-described manufacturing and processing difficulties in the prior art teachings, there is still a genuine need for economical processes for the production of pourable, powdery, filler-containing elastomeric mixtures, especially for carbon-black-containing elastomers widely used in the rubber industry.

Another process has recently been proposed whereby it is possible to produce in a simple and economical manner pourable, powdery, optionally filler-containing, particularly carbon-black-containing elastomeric mixtures. The process comprises emulsifying an elastomer dissolved in a volatile organic solvent, optionally containing mineral oil plasticizers, in water in the presence of an emulsifying amount of a quaternary ammonium salt cationic surfactant, and mixing the emulsion produced with the finely divided fillers suspended or dispersed in water. The filler-containing aqueous elastomer emulsion is gradually introduced into an aqueous alkali silicate solution while maintaining the aqueous solution at a pH greater than 2 and simultaneously evaporating the organic solvent to form discrete, finely divided, tack-free, filler-containing elastomer particles (German Application P 21 35 266.9). The elastomer particles produced according to the above process are a substantial advance in proceeding to desired simplified processing techniques.

OBJECTS OF THE INVENTION

It is an object of this invention to provide an improved process for the production of discrete, finely divided, tack-free elastomer particles, preferably containing a filler, from a solution of an elastomer in an inert organic solvent.

Another object of this invention is to provide an improved process for the production of pourable, discrete, finely divided, tack-free, preferably containing a carbon black filler, elastomer particles from an elastomer in an inert organic solvent containing a mineral oil plasticizer.

Another object of this invention is to provide an improved process for the production of pourable, discrete, finely divided, tack-free, filler-containing, preferably carbon black, elastomer particles from an emulsion of an elastomer and a filler.

Other objects and advantages of this invention will become apparent to those skilled in the art upon further study of the specification and appended claims.

SUMMARY OF THE INVENTION

It has now been found, in accordance with the process of this invention, that it is possible to produce, in a particularly simple and economical manner, pourable, powdery, optionally filler-containing, especially carbon-black-containing, elastomer mixtures. The process comprises emulsification of elastomer solutions, which optionally contain mineral oil plasticizers, in water which contains emulsifiers, and mixing the thus-obtained emulsions with fillers, particularly carbon blacks, suspended in water, optionally in the presence of emulsifiers. The emulsifying in water of the elastomer solutions, or the elastomer solutions which optionally contain mineral oil plasticizers, is performed in the presence of alkylamine oxyalkylates as emulsifiers. Into the emulsions obtained, suspensions of solid fillers, particularly carbon blacks, which suspensions optionally contain emulsifiers, are added. The filler-containing, aqueous emulsions of the elastomer solutions are continuously introduced into hot water, which optionally contains an alkali silicate solution, and wherein the pH during the entire precipitation step ranges between 0.1 and 7, preferably between 1.0 and 3.5 Simultaneously, the elastomer solvent is removed by continuous distillation, the filler-containing elastomer mixture is separated and is obtained in a finely divided form from the water, and thereafter the elastomer mixture is dried. By the concomitant use of alkali silicate solutions, the optimum quantity of acid required for precipitation can be considerably reduced.

The process of this invention thus represents a combination of measures critical to the process, constituting a successful procedure for producing pourable, powdery, filler-containing elastomer mixtures.

DETAILED DESCRIPTION OF THE INVENTION

Suitable as emulsifiers within the scope of the process of this invention are alkylamine and alkenylamine oxyalkylates of the general formula

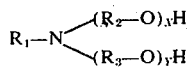

wherein $R_1$ is alkyl or alkenyl of 1–20 carbon atoms, preferably 12–18 carbon atoms; $R_2$ and $R_3$ are ethylene or propylene; and X and Y are integers between 1 and 80, preferably 6 to 20.

Especially preferred are compounds of the above formula wherein $R_1$ is lauryl, myristyl, cetyl, stearyl, oleyl, etc. Suitable alkylamine oxyalkylates and alkenylamine oxyalkylates include but are not limited to laurylamine-polyethylene-glycolethers with 2 to 20 ethyleneoxideunits, oleylamine-polyethylene-glycolethers with 2 to 20 ethyleneoxide-units, stearylamine-polyethyleneglycolethers with 2 to 20 ethyleneoxide-units, cetylamine-polyethylene-glycolethers with 2 to 20 ethyleneoxide-units, myristylamine-polyethylene-glycolethers with 2 to 20 ethylenoxide-units. Emulsifying amounts of the oxyalkylates of the above general formula are suitably 0.05 to 2%, preferably 0.1 to 1%, based on the weight of the elastomer solution.

The term "elastomer" as used herein refers to natural or synthetic polymers which have a high tensile strength as vulcanizates which stretch under tension and retract rapidly to their original dimensions. The term "vulcanizable" used herein refers to those elastomers which are sufficiently uncrosslinked to be soluble in a suitable organic solvent having a boiling point below that of water and which are capable of being crosslinked, e.g., by vulcanization, into a relatively insoluble form.

Elastomers useful in the present invention include but are not limited to: natural rubber; homopolymers, e.g., polybutadiene, polyisoprene; copolymers, e.g., styrene-butadiene rubber, nitrile rubber, ethylene-propylene copolymers, ethylene-propylene-diene copolymers.

Preferred elastomers are those which have been prepared by solution polymerization using an ionic catalyst, e.g., the Ziegler-Natta, Alfin, or lithium-based catalysts in an inert organic solvent having a boiling point below that of water, Solution of these elastomers can be converted directly into pourable particles without intermediate recovery of the polymerization product. Preferred elastomers in this connection are rubbery polymers, e.g., styrene-butadiene, polybutadienes, polyisoprene, ethylenepropylene, ethylene-propylene-diene, natural rubber, and polyalkenamers such as polyoctenamer on polypentenamer.

All known elastomer types soluble in organic solvents, including natural rubber, are suitable for the present process. Advantageously, polymers can be employed which cover a very wide range with respect to their molecular weights. Products having a solution viscosity [n] of between 1.0dl./g. and 10 dl./g can be used without any difficulties. The elastomer solutions are produced in a conventional manner by solution polymerization in the presence of, for example, Ziegler catalysts, Li catalysts, or Alfin catalysts, with the use of solvents such as pentane, hexane, heptane, and isooctane. Preferred are those polymers which can be produced in an aliphatic solvent and can be utilized immediately in the form ob tained upon polymerization, after an appropriate working-up step.

The elastomer solutions used in this invention contain 1 to 50, preferably 5 to 25, especially 10 to 20 percent by weight of elastomer.

The use of greatly excessive amounts of solvent is possible but requires more stringent conditions to evaporate the solvent during the precipitation step.

The solvents useful in this invention can be any liquid organic compound in which the elastomer is soluble and which are volatile, i.e., which have a boiling point below that of water in the aqueous emulsion of the elastomersolvent solution in water. These volatile solvents, which generally boil at least 10° C. and preferably at least 20° C. below the boiling point of water, and which are inert, i.e., do not deleteriously react with the elastomer under the reaction conditions encountered in the process of this invention are known in the art. Solvents or solvent mixtures which form an azeotrope, especially a negative azeotrope with water are preferred. Suitable inert organic solvents meeting these criteria include but are not limited to alkanes and cycloalkanes. Preferred are linear or branched alkanes of 5–8 carbon atoms, e.g., pentane, hexane, heptane, and isooctane.

Furthermore, the elastomer solutions can be produced by the redissolution of finished polymers, and accordingly emulsion polymers are also usable in the process of this invention.

The process of the present invention is especialy advantageous for use with special elastomers adapted to specific requirements, e.g., preferably a polybutadiene of a specific 1,2-content, and that having a vinyl group content respectively a 1,2-content of 15 to 75%, preferably 20 to 50%; ethylenepropylene rubber (EMP); ethylene-propylene diene rubber (EPDM); and copolymers of butadiene and styrene produced in solution. Similarly, the elastomer component can be copolymers of butadiene with 5–40%, preferably 10–30% of styrene incorporated therein, wherein the vinyl content of the polybutadiene proportion is 8–30%.

While, for example, the conventional known mixing technique fails when using either very high or very low molecular weight raw materials, it is possible to attain an optimum distribution of filler and/or auxiliary agents with the process of this invention, independently of the molecular weight, which considerably exceeds the customary homogeneity attainable by mechanical mixing processes.

Preferred fillers are the carbon blacks customary in the rubber industry, which include carbon blacks of all stages of activity; suitable carbon blacks include but are not limited to SAF (super abrasion furnace), ISAF (intermediate super abrasion furnace), HAF (high abrasion furnace), FEF (fast extruding furnace) and MT (medium thermal) blacks. In addition to or in place of one or more carbon blacks, it is also possible to incorporate mineral substances, e.g., highly active silicic acid, kaolin, ground slate, etc. All fillers are mixed, as emulsifier-free aqueous suspensions or as emulsifier-containing aqueous dispersions, with the aqueous elastomer emulsion, e.g., by simple stirring.

The emulsifiers to be used for the production of the emulsifier-containing aqueous dispersions are advantageously but not limited to the same alkylamine oxyalkylates which are employed in the production of the emulsions from elastomer solutions and water. The amount of carbon black to be utilized is between 1 and 500 wt.%, preferably between 40 and 110 wt.%, based on the weight of the elastomer. The quantity of light-colored fillers is between 1 and 500 wt.%, preferably between 25 and 150 wt.%, based on the weight of the elastomer. Combinations of carbon blacks with light-colored fillers are also usable.

Suitable mineral oil plasticizers are the refinery products customarily employed for this purpose, which, depending on the purpose for which they are to be used, can contain aromatic, naphthenic and/or paraffinic hydrocarbons.

It is possible according to the process of this invention to incorporate into the elastomer phase not only fillers, e.g., carbon black or silicic acid in an optimum dispersion and in almost any desired amounts, but also all auxiliary agents required for the vulcanization, e.g., antiaging agents, zinc oxide, stearic acid, sulfur, vulcanization accelerators, etc.

In order to produce a carbon black-oil- elastomer mixture, it is necessary to admix the oil and the elastomer solution prior to emulsification. These oil-extended mixtures can also be precipitated in powder form according to the process of this invention and can again be gound into powders after drying.

One variant of the process resides in stirring the oil and the fillers together into the elastomer solution prior to emulsification. This is accomplished, for example, by suspending or dispersing the carbon black, e.g., by means of a colloid mill, in hexane or in the mineral oil plasticizer, and then stirring this suspension of dispersion into the elastomer solution. Thereafter, the solution, which contains all of the fillers, is emulsified in water according to this invention. Subsequent process steps are identical to those described hereinabove.

In a specific embodiment of the invention, whereby increased economy is obtained in the production of a pourable, carbon black-oil-containing elastomer mixture, the mineral oil plasticizer is added to the powdery, oil-free carbon black-containing elastomer mixture in a powder mixer, e.g., a Henschel mixer. Surprisingly, the dry consistency of the material, a prerequisite for its pourability, is preserved during the mixing procedure. Thereby, the variability in the elastomer processing range is increased. In this manner it is not necessary for the plasticizer to be carried through the production lines during the preparation of elastomer powder batches, together with the other required components. This results in increased economies in production.

The process of this invention comprises the following procedural steps: The elastomer solutions, which optionally contain a mineral oil plasticizer, and which are preferably a solution of elastomer in a volatile, normally liquid aliphatic hydrocarbon, are emulsified in water, in the presence of the alkylamine or alkenyl oxyalkylates emulsifiers of the present invention, with the aid of dispersing devices, for example agitators, mills, ultrasonic mixers, mixing nozzles, etc. The emulsification is conducted in most cases at room temperature; however it can in some cases be advantageous to operate at temperatures up to 200° C. and above atmospheric pressure. This latter procedure is especially advisable when using highly viscous solutions.

The volume ratio of the aqueous phase to the organic solvent phase in the aqueous emulsion is generally 0.3:1 to 5.0:1, preferably 0.75:1 to 1.5:1. Following emulsification, the suspension or dispersion of the fillers, preferably carbon black, as well as the use of any solid auxiliary agents required for the vulcanization, e.g., antiaging agents, zinc oxide, stearic acid, sulfur, and vulcanization accelerators, etc., are introduced into the emulsion. The volume ratio of the aqueous suspension or dispersion of filler to the aqueous emulsion is generally 0.25:1 to 5:1, preferably 0.75:1 to 1.5:1. The aqueous emulsion of the elastomer solution obtained in this way and containing all auxiliary agents is gradually, preferably continuously introduced into a hot water precipitating bath preferably comprising a hot aqueous alkali silicate solution, the pH of the water ranging between 0.1 and 7 and preferably between 1.0 and 3.5.

The pH of the hot water precipitating bath can range between 0.1 and 7, preferably between 1.0 and 3.5. The acidity of the water bath is obtained by adding mineral acids, e.g., HCl, $H_2SO_4$ and $H_3PO_4$, thereto. The alkali silicatecontaining aqueous precipitating solutions are preferably sodium silicate solutions having molar ratios of $Na_2O : SiO_2$ of 2 : 1 to 1 : 4. The amounts of $SiO_2$ contained in the alkali silicate solution, which are necessary for precipitation, are generally 2–20 moles, preferably 4–12 moles per mole of the surfactant. The pH of the aqueous alkali silicate solution is maintained above 2, preferably between 7 and 12, in order to avoid a condensation reaction of the silicate anions.

The filler-containing aqueous elastomer emulsion is gradually introduced into the hot water or alkali silicate solution either batchwise or continuously under conditions which simultaneously remove the organic solvent component, preferably at a rate whereby the solvent is removed as rapidly as it is introduced. While these conditions can be provided by various means, e.g., evaporation under reduced pressure, it is advantageous to effect removal of the organic solvent component by providing the hot water or hot aqueous alkali silicate solution at a temperature above the azeotropic boiling point of the inert organic solvent in the aqueous emulsion, preferably about 80°–95° C. In this connection, the use of inert organic solvent which forms a negative azeotrope with water is especially advantageous due to the low boiling of the azeotrope.

The precipitation procedure and the distilling off of the solvent are conducted in a single step without troublesome foam formation, preferably under agitation at pressures at, below or above atmospheric pressure, and at temperatures above the azeotrope boiling point of the organic solvent and water. The filler-containing aqueous elastomer emulsion is gradually introduced into a 0.1 to 5 fold volume of hot water, preferably alkali silicate-containing solution. In this procedure, the filler- rubber-mixture which optionally contains mineral oil plasticizers is obtained in an unusually finely-divided particulate, non-tacky form, wherein the average diameter of the particles vary between 50 and 1000 $\mu$, preferably between 300 and 700 $\mu$.

The elastomer mixture, produced in a finely divided form after the precipitation and after removing the organic solvent, is freed of the main amount of water, i.e. generally 98.5 to 99.8% of the water present is removed, e.g., by conventional filtration or decantation on screens, rotary cellular filters, suction filters, centrifuges, or the like and is dried according to conventional methods, e.g., in belt dryers, drum dryers, fluidized-bed or spray-drying plants, preferably under continuous movement. The thus-obtained elastomer particles are pourable, tack-free, i.e., exhibits extremely little if any tackiness, and can be ground, if necessary, into powders of any desired grain sizes, e.g., in suitable mills.

In addition to preparing directly vulcanizable particulate elastomer compositions, the present invention can be utilized to prepare intermediate particular compositions into which additives can be subsequently incorporated prior to vulcanization.

In a further embodiment of the present invention, the pourable elastomer particles produced according to this invention are used for the production of shaped elastomer articles, optionally with the concomitant employment of additional auxiliary agents, and either with or without the use of further plasticizing treatment. The vulcanized products of this invention demonstrate, in each case, a greatly improved physical property spectrum as compared to samples mixed under conventional mechanical conditions, e.g., those described by S. Bostrom, Kautschuk-Handbuch, Band 2 (1960), Kapitel 2 "Verarbeitungstechnik."

If auxiliary agents are to be admixed to the particulate elastomer mixtures for further processing at a later date, it is possible to conduct such admixing by means of very simple agitator systems. e.g., the Loedige, Papenmeier, or Henschel mixers. For purposes of final shaping, the powder mixture can be directly fed into extruders, calenders, transfer molding systems, or automatic injection molding machines. When introducing elastomer mixture of the present invention into a rolling mill, a smooth sheet is obtained after only a single pass. The conversion from the powdery into the plastic state thus requires only minimum expenditure. Consequently, it is possible in a surprisingly simple manner to utilize the elastomer mixture directly in the final stage of the conventional elastomer processing operation, without the use of heavy mechanical devices. In this way, it is possible to manufacture directly flawless elastomer articles usable for technical application with a reduced number of production stages using economical and automated processing methods, and with greatly reduced investment costs.

The invention will be explained in greater detail with reference to the following examples.

Without further elaboration, it is believed that one skilled in the art can, using the preceding description, utilize the present invention to its fullest extent. The following preferred specific embodiments are, therefore, to be construed as merely illustrative, and not limitative of the reminder of the disclosure in any way whatsoever. Unless otherwise indicated, all percentages are by weight. Comparison materials used as controls were prepared in the following way: In a masticator the elastomer is kneaded 1 minute at a temperature of 50° C. Then the compounding ingredients, e.g., carbon black, oil, zinc oxide, stearic acid, but without sulfur and vulcanization accelerator are added. The mixture is kneaded for 9 minutes and then rolled. After a storage period of 6 hours, sulfur and vulcanization accelerator are added and the mixture is rolled again at a temperature of 50° C. during a time period of 5 minutes. After this procedure the mixture is ready for the vulcanization.

EXAMPLE 1

30 kg. of a 10% solution of a polybutadiene having a vinyl group content of 35% and a Mooney viscosity of 93, which was prepared by the solution polymerization of butadiene with a butyllithium catalyst with the addition of 1,2-dimethoxyethane in hexane, is emulsified in 14.82 l. of water with the aid of an ultrasonic emulsifier device (commercial name, "Ultra-Turrax Mixer") in the presence of 180 g. of laurylamine oxyethylate (sum total X + Y = 12 in the general formula as set forth heretofore). 51 kg. or a 5% aqueous suspension of ISAF carbon black ("Corax 6") at a pH of 9.2 is stirred into the thus-obtained emulsion. The resultant carbon-black-containing emulsion is stable over a period of several days and exhibits no blooming or exudates. This stable emulsion is allowed to flow into a kettle having a volume capacity of 250 liters. This vessel had previously been charged with an agitating mixture, heated to 90°–95° C., of 103.6 l. of water, 243 g. of 26% aqueous sodium silicate solution and 1.02 kg. of 10% sulfuric acid, pH 1.8. The elastomer mixture is precipitated at once as a finely divided powder, while simultaneously the solvent, hexane, is distilled off without foaming. The pH of the precipitation bath rises from 1.8 to 2.3 during this process step. After the hexane has been entirely distilled from the mixture, the precipitated powder is a vacuum filtered. The filtered carbon-black-containing elastomer mixture readily separates into a loose moist material. It is dried under vacuum at 75° C., and a pourable, non-tacky powder is produced.

EXAMPLE 2

600 g. of plasticizer oil having a high content of aromatics ("Naftolen MV") is stirred into 15 kg. of a 10% solution of a polybutadiene having a vinyl group proportion of 35% and a Mooney viscosity of 90, and which was prepared by the solution polymerization of butadiene with a butyllithium catalyst with the addition of 1,2-dimethoxyethane in hexane. The oilcontaining elastomer solution emulsified in 15.5 l. of water with the aid of an ultrasonic emulsifying device (commerical name, "Ultra-Turrax Mixer") in the presence of 93.5 g. of laurylamine oxyethylate (sum total $X + Y = 12$ in the general formula as set forth heretofore). At a pH of 8.9, 25.5 kg. of a 5% aqueous suspension of ISAF carbon black ("Corax 6") is stirred into the thus-obtained emulsion. The resultant carbon-black-containing emulsion of the oil-containing elastomer solution is stable and is allowed to flow, under agitation, into a kettle containing a mixture, preheated to 90°–95° C., of 40.5 l. of water, 543 g. of 10% sulfuric acid, and 192 g. of a 26% aqueous sodium silicate solution, pH 2.0. The solvent is distilled off without foaming, and at the same time the carbon-black and oil-containing elastomer mixture precipitates in a very finely divided form. After the hexane solvent has been entirely removed from the mixture, the aqueous phase (pH 2.5) is separated from mixing time of 3 minutes in the mixer, a sufficient homogeneity is obtained. The resultant elastomer mixture is still pourable and is extruded, by means of an extruder (screw 15 d; $\phi$ 5 cm.; speed 30 r.p.m.; jacket temperature 70° C.; head temperature 90° C.), into a profile member having a diameter of 10 mm. The extruded product has a smooth surface and does not show, in cross section, any non-homogeneity. A portion thereof is pressed into sheets having a thickness of 4 mm. and vulcanized at 143° C. In order to test the vulcanization characteristic of the vulcanized elastomer, another vulcanizate sample was produced and subjected to the rheometer test (Monsanto).

A vulcanizate produced under conventional conditions was prepared for comparison purposes. The vulcanizate mixture was prepared from the elastomer component of Example 1 (polybutadiene having a vinyl group content of 35% and Mooney viscosity of 93) mixed with the additives above mentioned, whereby the mixture is identical in its composition as that comprising the pourable powder mixture of this example. The comparison vulcanizate mixture was produced for a period of 10 minutes on a rolling mill (400 × 250 mm.) preheated to a temperature of 50° C. and vulcanized at 143° C. The data of the respective vulcanizates are set forth in Table 1. The improved properties of the pourable elastomer mixtures of this invention are clearly apparent in the increased tensile strength properties.

TABLE 1

| Mixture | Monsanto* Rheometer 143° C. | | Vulcanization at 143° C. | Tensile Strength kg.cm.² | Elongation % | Modulus 300% | Permanent Elongation % | Hardness ° Shore 20° C. | Elasticity | | Compr. Set |
|---|---|---|---|---|---|---|---|---|---|---|---|
| | $t_{10}$ | $t_{90}$ | | | | | | | 20° C. | 75° C. | |
| Rubber powder acc. to Example 1 | 8.0 | 13.8 | 30' | 135 | 322 | 121 | 10 | 66 | 33 | 45 | |
| | | | 60' | 135 | 336 | 120 | 9 | 66 | 34 | 45 | 21 |
| | | | 90' | 136 | 328 | 120 | 10 | 67 | 34 | 43 | |
| Comparison mixture produced on rolling mill | 8.9 | 16.8 | 30' | 115 | 380 | 94 | 15 | 62 | 37 | 44 | |
| | | | 60' | 124 | 356 | 95 | 13 | 64 | 38 | 44 | 22 |
| | | | 90' | 122 | 368 | 95 | 13 | 64 | 38 | 44 | |

*$t_{10}$ and $t_{90}$ = time (minutes) to reaching 10% and 90%, respectively, of the final cross-linking value.

the precipitate by vacuum filtration and the precipitate is dried under vacuum at 75° C. The dried precipitate material can be gound in a mill to a pourable powder of any desired grain size.

EXAMPLE 3

One kilogram of the pourable carbon-black-containing elastomer powder obtained according to Example 1 is mixed, in a powder mixer (capacity 10 liters; model Henschel), at a speed of 1800 r.p.m. within a time period of 4 minutes with 5 parts by weight of ZnO, 2 parts by weight of stearic acid, 2.2 parts by weight of sulfur, and 1.2 parts by weight of N-cyclohexylbenzothiozole sulfenamide, "Vulkacit CZ" based on 100 parts by weight of the elastomer contained in the elastomer powder. Thereafter, 50 parts by weight of plasticizer oil ("Naftolen MV") based on 100 parts by weight of elastomer in the elastomer powder, is allowed to flow gradually into the mixture over a period of 60 seconds. After an additional

EXAMPLE 4

One kilogram of the elastomer powder prepared in accordance with Example 2 is mixed analogously as in Example 3 in a powder mixer (model Henschel) at a speed of 1800 r.p.m. for a period of 4 minutes with 5 parts by weight of ZnO, 2 parts by weight of stearic acid, 2.2 parts by weight of sulfur, and 1.2 parts by weight of "Vulkacit CZ," based on 100 parts by weight of the rubber contained in the rubber powder. The pourable mixture produced is formed into disk-shaped molded articles having a thickness of 1 mm. and a diameter of 130 mm. by means of an automatic injection molding machine (type Stübbe S 150/235; screw 12 d; $\phi$ 50 mm.; compr. 1 : 1.8; vulcanization 120 seconds at 190° C.) The surface and cross section of these articles do not exhibit any non-homogeneity. From these molded articles, test bodies were punched out in accordance with DIN 53 502 (standard rod II). The data of the physisal properties thereof are set forth in Table 2.

| Mixture | Tensile Strength kg./cm² | Elongation % | Modulus 300% | Permanent Elongation % | Hardness °Shore 20°C. | Elasticity 20°C. | Elasticity 75°C. |
|---|---|---|---|---|---|---|---|
| Elastomer Powder of Example 2 | 129 | 324 | 124 | 10 | 63 | 38 | 48 |

From Table 2, it is clear that the powder mixtures produced according to the present invention are suitable as starting material for injection molding.

EXAMPLE 5

25 kg. of a 10.4% solution of a polyoctenamer having a trans-content of 65-75% and a RSV value of 1.0, (prepared by the solution polymerization of cyclooctene in hexane with the aid of a so-called "metathesis-reaction"; described by Calderon N. et al., Tetrahedron Letters 34, 3327-3329 (1967).) is emulsified with 24.8 l. of water, using the "Ultra-turrax" mixer, in the presence of 150 g. of laurylamine oxyethylate (sum total X + Y = 12 in the general formula as set forth heretofore) and 50 g. of a 10% sodium hydroxide solution. At a pH of 12.1, 26.0 kg. of a 5% aqueous suspension of ISAF black ("Corax 6") is stirred into the emulsion. The stable, carbonblack-containing emulsion obtained exhibits no blooming even when allowed to stand for a longer period of time. The emulsion is gradually admixed with a solution, heated to 55° C., of 83.6 l. of water, 2.14 kg. of 10% sulfuric acid, and 252 g. of 26% sodium silicate solution, at a pH of 0.8 in a 250 liter reactor. The reactor had been evacuated to 15 mm. Hg. The batch of polyoctenamer and carbon black is precipitated in a finely divided form. The solvent hexane is vacuum distilled with no foaming. The precipitate batch is separated from the water by filtration and the pH of the filtrate is 1.1. The moist mixture of polyoctenamer and carbon black is vacuum dried at 35° C. The dried product is ground at a temperature not exceeding 30° C. A pourable, non-tacky powder is obtained. The powder is fed to a rolling mill, heated to 70° C., and a smoothly traveling sheet is immediately produced and within 5 minutes the following components are admixed therewith, 3 parts by weight of ZnO, 2 parts by weight of stearic acid, 0.5 part by weight of sulfur, 1.0 part by weight of "Vulkacit CZ", and 0.1 part by weight of "Vulkacit" Thiuram, based on 100 parts by weight of the elastomer contained in the pourable powder product. Test articles were formed and vulcanized at 150° C. For comparison purposes, a mixture of the same composition was prepared wherein the same proportions of carbon black and oil were admixed with the elastomer on a rolling mill. The data of the physical properties are set forth in Table 3.

EXAMPLE 6

25 kg. of a 10% solution of a polybutadiene with a vinyl group proportion of 35% and a Mooney viscosity of 91, (prepared by the solution polymerization of butadiene with the aid of butyllithium under the addition of 1,2-dimethoxyethane in hexane) is emulsified with 23.5 l. of water using the "Ultra-Iurrax" mixer in the presence of 1.5 kg. of laurylamine oxyethylate (sum total X + Y = 12 in the general formula). At a pH of 10.3, 37.5 kg. of a 5% aqueous suspension of ISAF carbon black ("Corax 6") is stirred into the emulsion. The stable, carbon-black-containing emulsion is gradually admixed with a solution, heated to 90°-95° C., of 100 l. of water and 3.15 kg. of 10% sulfuric acid, at a pH of 1.1 in a 250 liter reactor. The carbon-containing elastomer mixture is precipitated in an extremely finely divided form, while simultaneously the hexane solvent is vacuum distilled without any disturbing foaming. When the hexane has been completely removed, the product is vacuum filtered. The filtered, moist carbon-black-containing elastomer mixture easily separates into a loose, powdery, moist material, which is dried at 75° C. under a vacuum. A pourable, non-tacky powder product is obtained.

A vulcanization mixture was prepared analogously as in Example 3 by means of a powder mixer. The finished mixture was drawn into a sheet pressed into test articles, and simultaneously vulcanized at 143° C. The data of the physical properties of vulcanizate are set forth in Table 4.

TABLE 3

| Mixture | Vulcanization at 150° C. | Tensile Strength kg./cm² | Elongation % | Modulus 300% kg./cm² | Permanent Elongation % | Hardness °Shore 20°C. | Elasticity 20°C. | Elasticity 75°C. |
|---|---|---|---|---|---|---|---|---|
| Rubber powder | 50° | 149 | 476 | 75 | 14 | 61 | 34 | 38 |
| | 70° | 160 | 456 | 78 | 13 | 61 | 35 | 38 |
| | 100° | 140 | 414 | 80 | 10 | 61 | 36 | 37 |
| Comparison mixture | 50° | 123 | 422 | 73 | 15 | 60 | 34 | 40 |
| | 70° | 120 | 414 | 70 | 13 | 60 | 34 | 40 |
| | 920° | 129 | 376 | 74 | 11 | 61 | 33 | 37 |

The tensile strength properties of the vulcanizates made of the rubber powder produced according to this invention are markedly higher.

TABLE 4

| Vulcanization at 143° C. | Tensile Strength kg./cm² | Elongation % | Modulus 300% kg./cm² | Permanent Elongation % | Hardness ° Shore 20° C. | Elasticity 20° C. | Elasticity 75° C. |
|---|---|---|---|---|---|---|---|
| 30° | 141 | 345 | 116 | 10 | 62 | 36 | 45 |
| 60° | 138 | 332 | 112 | 9 | 64 | 36 | 45 |
| 90° | 136 | 340 | 112 | 10 | 64 | 32 | 43 |

Physical property measurements given for the preceding Examples were determined by standard testing methods. Tensile strength was determined according to DIN 53 504. Elongation was measured according to DIN 53 504. Modulus 300% was tested by DIN 53 504. Permanent elongation was measured by DIN 53 504. Shore Hardness was determined according to DIN 53,505, and Elasticity was determined according to DIN 53 512. Compression Set was determined according to DIN 53 517.

The preceding examples can be repeated with similar seccess by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing pourable, discrete, finely-divided, tack-free, elastomer particles, said process comprising preparing an emulsion comprising water, a volatile inert water insoluble organic solvent selected from the group consisting of alkanes and cycloalkanes having dissolved therein an elastomer, and an emulsifying amount of a surfactant of the general formula

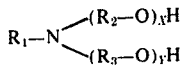

wherein $R_1$ is alkyl or alkenyl of 1-20 carbon atoms, $R_2$ and $R_3$ are ethylene or propylene; and X and Y are integers between 1 and 80, gradually introducing said emulsion into a precipitating aqueous bath while maintaining said bath at a pH between 0.1 and 7 and simultaneously separating said organic solvent from said bath thereby obtaining a precipitate in water, separating said precipitate from the water and thereafter drying said precipitate, thereby obtaining discrete, finely-divided, tack-free particles comprising said elastomer.

2. A process for producing pourable, discrete, finely divided, tack-free, filler-containing elastomer particles, said process comprising preparing an emulsion comprising water, a volatile inert water insoluble organic solvent selected from the group consisting of alkanes and cycloalkanes having dissolved therein an elastomer, a filler, and an emulsifying amount of a surfactant of the general formula

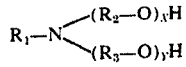

wherein $R_1$ is alkyl or alkenyl of 1-20 carbon atoms, $R_2$ and $R_3$ are ethylene or propylene; and X and Y are integers between 1 and 80, gradually introducing said emulsion into a precipitating aqueous bath while maintaining said bath at a pH between 0.1 and 7 and simultaneously separating said organic solvent from said bath thereby obtaining a precipitate in water, separating said precipitate from the water and thereafter drying said precipitate, thereby obtaining discrete, finely-divided, tack-free comprising said filler and elastomer.

3. A process for producing pourable, discrete, finely-divided, tack-free, filler-containing elastomer particles comprising, preparing an emulsion in water of an elastomer dissolved in a volatile inert water insoluble organic solvent selected from the group consisting of alkanes and cycloalkanes using an emulsifying amount of a surfactant having the general formula

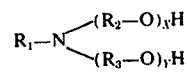

wherein $R_1$ is alkyl or alkenyl of 1-20 carbon atoms, $R_2$ and $R_3$ are ethylene or propylene; and X and Y are integers between 1 and 80, preparing an aqueous suspension of fillers, mixing said elastomer emulsion and said suspension of fillers to obtain a filler-containing elastomer emulsion, and gradually introducing it into an aqueous precipitating bath while maintaining said bath at a pH between 0.1 and 7 and simultaneously separating said organic solvent from said bath thereby obtaining a precipitate in water, separating said precipitate from the water and thereafter drying said precipitate thereby obtaining discrete, finely-divided, tack-free, filler-containing elastomer particles.

4. The process of claim 3 wherein said elastomer emulsion includes mineral oil plasticizer in amounts of 1 to 200% by weight, based on the weight of the elastomer.

5. The process of claim 3 wherein said filler is carbon black and said suspension of fillers includes an emulsifier.

6. The process of claim 3 wherein said filler is silicic acid and suspension of fillers includes an emulsifier.

7. The process of claim 3 wherein said surfactant is an alkylamine oxyalkylate, $R_1$ has 12-18 carbon atoms, and X and Y are integers of 6 to 20.

8. The process of claim 3 wherein said surfactant is an alkenylamine oxyalkylate, $R_1$ has 12-18 carbon atoms, and X and Y are integers of 6 to 20.

9. The process of claim 3 wherein said surfactant is a lauryl oxyalkylate.

10. The process of claim 3 wherein said surfactant is a myristyline oxyalkylate.

11. The process of claim 3 wherein said surfactant is a cetylamine oxyalkylate.

12. The process of claim 3 wherein said surfactant is a stearylamine oxyalkylate.

13. The process of claim 3 wherein said surfactant is an oleylamine oxyalkylate.

14. The process of claim 3 wherein the surfactant is present in amounts between 0.05% and 2 % by weight, based on the weight of the elastomer in the solution.

15. The process of claim 3 wherein an organic solvent is selected from the group consisting of aliphatic and cycloaliphatic hydrocarbons of 5–8 carbon atoms.

16. The process of claim 3 wherein the emulsification is conducted at temperatures up to 200° C.

17. The process of claim 3 wherein the filler is present in amounts by weight between 40 and 150% based on the weight of the elastomer.

18. The process of claim 3 wherein the pH of the precipitating bath is maintained between 1.0 and 3.5 during the precipitation step.

19. The process of claim 3 wherein the said precipitation bath comprises an alkali metal silicate.

20. The process of claim 19 wherein the alkali metal silicate is sodium silicate having molar ratios in the solution of $Na_2O : SiO_2$ of 2 : 1 to 1 : 4.

21. The process of claim 19 wherein the amount of alkali metal silicate present in said precipition bath is 1–20 moles of $SiO_2$ per mole of surfactant present in the emulsion added to the bath.

22. The process of claim 19 wherein the pH of the alkali silicate-containing precipitation bath is between 1.0 and 3.5.

23. The process of claim 3 wherein the temperature of the precipitation bath is above the azeotrope boiling point of said solvent and water.

24. The process of claim 3 wherein said separation of said solvent from said bath is conducted by distillation at pressures at, below and above atmospheric pressures.

25. The process of claim 3 wherein the filler-containing elastomer emulsion also includes auxiliary agents selected from the group consisting of antiaging agents, zinc oxide, stearic acid, sulfur, and vulcanization accelerators.

26. The process of claim 3 wherein the elastomer is polybutadiene with vinyl group content between 25 and 50%.

27. The process of claim 3 wherein the elastomer is a copolymer of butadiene with 5–40% styrene and wherein the vinyl group content of the polybutadiene proportion is 8–30%.

28. A process of producing shaped objects comprising mixing the pourable composition made by the process of claim 2 with sulfur and vulcanization accelerators, and shaping and vulcanizing said mixture.

29. The process of claim 1 wherein $R_1$ has 12–18 carbon atoms, and X and Y are integers of 6 to 20.

30. The process of claim 2 wherein $R_1$ has 12–18 carbon atoms, and X and Y are integers of 6 to 20.

31. The process of claim 3 wherein $R_1$ has 12–18 carbon atoms, and X and Y are integers of 6 to 20.

* * * * *